United States Patent Office 2,713,595
Patented July 19, 1955

2,713,595
CHLORINATED N-BROMOACETAMIDES AND PROCESS FOR MAKING THEM

Joseph D. Park and John R. Lacher, Boulder, Colo., and Henry J. Gerjovich, Wilmington, Del., assignors to Arapahoe Chemicals, Inc., Boulder, Colo., a corporation of Colorado No Drawing. Application October 2, 1951, Serial No. 249,388

8 Claims. (Cl. 260—561)

This invention relates to novel brominating agents and the process of producing them. More specifically, it relates to the preparation of chlorinated N-bromo-acetamides.

Objects and advantages of the invention will be set forth in part hereinafter and in part will be obvious herefrom, or may be learned by practice with the invention, the same being realized and attained by means of the steps and compositions pointed out in the appended claims.

An object of this invention is to prepare novel brominating agents which can be utilized in a variety of chemical reactions.

Another object of this invention is to prepare novel brominating agents by processes which are efficient but which are relatively simple of manipulation.

A further object of the invention is to prepare chlorinated-N-bromo-acetamides in relatively high yields.

In general, the invention is directed to the preparation of novel compounds of the formula

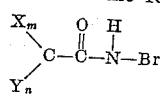

wherein X is a chlorine atom, Y is a hydrogen atom, $m+n$ is 3, $m$ is from 1 to 3 and $n$ is from 0 to 2. These compounds are prepared by reacting a chlorinated acetamide with bromine and a heavy metal oxide in the presence of a perfluorinated acid solvent. By perfluorinated acid is meant that every hydrogen atom of the aliphatic chain has been substituted by fluorine and it is essential that a solvent of this type be used in order to obtain the desired results. The less fluorinated acids, such as monofluorinated acid, are not desirable since they are difficult to obtain and are highly toxic. Although brominating agents of the prior art such as N-bromoacetamide, N-bromosuccinimide and N-bromophthalimide, are easily formed in an aqueous system, the compounds of the present invention cannot be made in an aqueous medium but can only be produced in solution in substances of the type illustrated by perfluorinated acids.

More specifically the invention relates to the preparation of mono, di and trichlorinated N-bromoacetamides by reacting the chloroacetamide with bromine and silver oxide in the presence of trifluoroacetic acid as a solvent. Although trifluoroacetic acid is the most suitable solvent medium for the preparation of the compounds of this invention, the higher perfluorinated fatty acids may also be used. Illustrated examples of the other perfluorinated acids which may be used are pentafluoropropionic acid, heptafluorobutyric acid, etc. Among the heavy oxides which may be used besides silver oxide are mercurous oxide, lead oxide, etc.

In order to illustrate the invention more clearly, the following examples are given.

EXAMPLE I

To a solution of 0.1 mole of silver oxide in 250 ml. of anhydrous trifluoroacetic acid, was added 0.2 mole of trichloroacetamide. The reaction mixture was stirred at room temperature for one hour, and then a solution of 0.2 mole of bromine dissolved in 100 ml. of trifluoroacetic acid was added dropwise through a dropping funnel. Stirring was maintained during the addition of bromine and for an additional half-hour. The silver bromide which formed was filtered off on a sintered-glass disc and washed well with trifluoroacetic acid. The trifluoroacetic acid was removed by distillation at room temperature at 20 mm. pressure. After approximately three-quarters of the trifluoroacetic acid had been distilled off, a considerable amount of crystalline material separated out of the solution. The distillation was discontinued and the solid was filtered off and washed twice with cold trifluoroacetic acid. After evacuating the solid for one hour at room temperature under 1 mm. pressure, 29 g. (60% of the theoretical amount) of N-bromotrichloroacetamide was obtained. By analysis with potassium iodide and thiosulfate the compound was found to contain 32.98% bromine, while the theoretical amount of bromine indicated by the formula $C_2HONCl_3Br$ is 33.12%. The melting point observed was 124–125° C.

Additional N-bromotrichloroacetamide was obtained by complete removal of the trifluoroacetic acid from the mother liquors. The residue obtained was sublimed at 5 mm. pressure and 95° C. The sublimation residue was dissolved in hot $CCl_4$ and cooled. Ten grams of N-bromotrichloroacetamide crystallized as fine plates. A total conversion of 81% to N-bromotrichloroacetamide was thus obtained.

EXAMPLE II

To a solution of 0.1 mole of silver oxide in 250 ml. of anhydrous trifluoroacetic acid, was added 0.2 mole of dichloroacetamide. The reaction mixture was stirred at room temperature for one hour, and then a solution of 0.2 mole of bromine dissolved in 100 ml. of trifluoroacetic acid was added dropwise through a dropping funnel. Stirring was maintained during the addition of bromine and for an additional half-hour. The silver bromide which formed was filtered off on a sintered-glass disc and washed well with trifluoroacetic acid. The trifluoroacetic acid was removed by distillation at room temperature at 20 mm. pressure. After approximately three-quarters of the trifluoroacetic acid had been distilled off, a considerable amount of crystalline material separated out of the solution. The distillation was discontinued and the solid was filtered off and washed twice with cold trifluoroacetic acid. After evacuating the solid for one hour at room temperature under 1 mm. pressure, 29 g. (60% of the theoretical amount) of N-bromodichloroacetamide was obtained. The N-bromodichloroacetamide obtained in a 76% yield had a melting point of 96° C.

EXAMPLE III

In the same way as in Example I, 0.1 mole of silver oxide, 0.2 mole of monochloroacetamide, and 0.2 mole of bromine were allowed to react in solution in trifluoroacetic acid. Since the N-bromomonochloroacetamide did not, however, crystallize during the removal of trifluoroacetic acid, essentially all of the solvent was removed under vacuum and the residue was then chilled to 0° C. Crystallization occurred slowly. The semisolid residue was dissolved in chloroform or carbon tetrachloride and then cooled, producing N-bromomonochloroacetamide as fine while needles melting at 75° C. Analysis for bromine indicated that the compound contained 46.37% bromine (46.37% calc. for $C_2H_3ONClBr$). A yield of 61% of the theoretical amount was obtained. The crude residue may alternatively be purified by subliming out traces of unreacted amide and distilling off traces of remaining trifluoroacetic acid at 75° C. and 5 mm. pressure.

EXAMPLE IV

To a solution of 0.245 mole of silver oxide and 0.490 mole of trichloroacetamide in 50 ml. of heptafluorobutyric acid was added dropwise with stirring 0.512 mole of bromine. The mixture was stirred for an hour and then the precipitated silver bromide was filtered off and washed twice with 25 ml. portions of carbon tetrachloride, the washings being retained separately. A quantitative recovery of the theoretical amount of silver bromide was achieved. The heptafluorobutyric acid was removed from the original filtrate by distillation at 3 mm. pressure. The N-bromotrichloroacetamide which remained was crystallized from the carbon tetrachloride washings referred to above. After purification by sublimation the product melted at 125° C. The conversion of trichloroacetamide to N-bromotrichloroacetamide was 97% of the theoretical value.

These compounds possess unique brominating properties heretofore unknown and unpredictable on the basis of the prior art. These properties will become evident from the studies described below. Thus, a study of the brominating properties of these compounds with cyclohexene demonstrates the enhanced "positive" character of the bromine atom. In this study it was observed that cyclohexene reacts with N-bromotrichloroacetamide (Equation 1) to yield predominantly N-(2-bromocyclohexyl)-trichloroacetamide; with N-bromodichloroacetamide (Equation 2) the product is largely 3-bromocyclohexene; with N-bromomonochloroacetamide (Equation 3) the product is predominantly 1,2-dibromocyclohexane. In contrast with these results, is the bromination of cyclohexene with N-bromoacetamide (Equation 4), where a 3-bromocyclohexene was obtained.

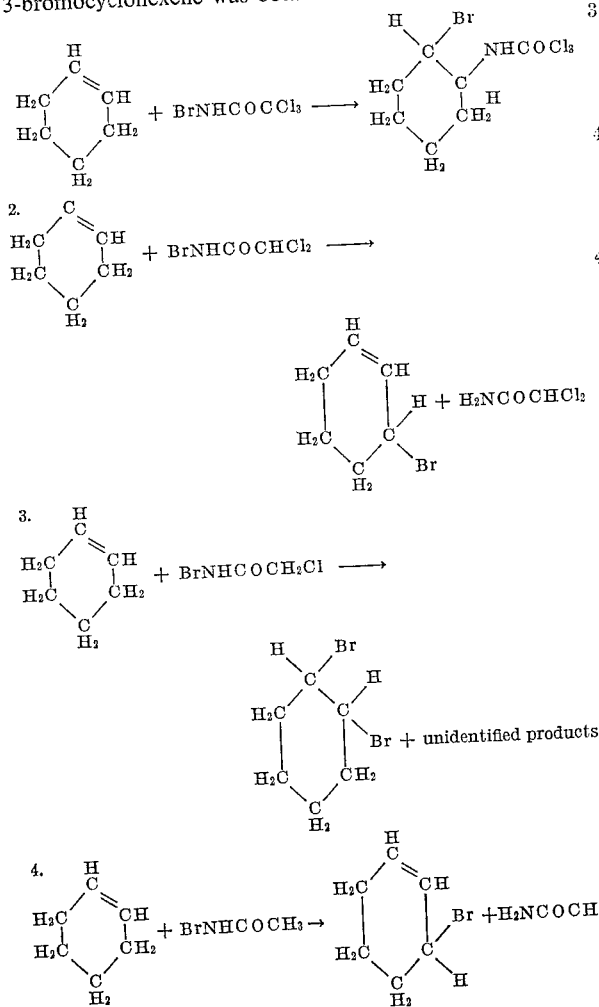

It will be noted that the three new compounds give three different products in their reaction with cyclohexene. This result is entirely unexpected in view of the prior art. Even more unexpected is the result that of the three new compounds, it was the dichlorosubstituted acetamide which produced the same product as did the unsubstituted acetamide. One would have predicted that a gradation of properties from unsubstituted N-bromoacetamide to monosubstituted to disubstituted to trisubstituted would be the case rather than the entirely discontinuous variation of properties which was observed.

The reaction of these same new compounds with toluene likewise gives rise to an unusual order of reactivity. It should be emphasized, however, that the order of reactivity is not the same with toluene as was observed with cyclohexene. While all of the compounds react with toluene to produce monobrominated toluenes in yields of 50 to 72%, the constitution of the monobrominated toluenes is very different in each case.

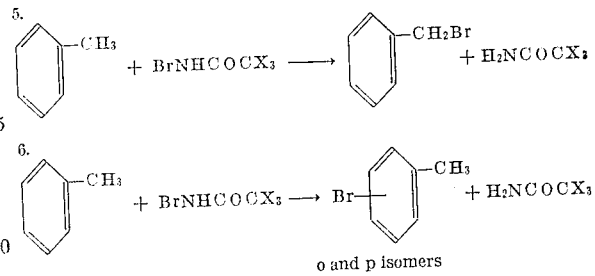

o and p isomers

It will be seen from the data presented in Table I that unsubstituted N-bromoacetamide produces a monobrominated toluene which is entirely the result of reaction with the side-chain (Equation 5), while the monosubstituted N-bromoacetamide produces almost entirely nuclear substitution (Equation 6). The di- and trisubstituted compounds produce both nuclear and side-chain bromination, with the trisubstituted N-bromoacetamide being most like the unsubstituted N-bromoacetamide.

*Table I*

BROMINATION OF TOLUENE AT 90–103° C.

| Compound | Percent Conversion to Monobromotoluenes | Type of Substitution | |
|---|---|---|---|
|  |  | Percent Nuclear | Percent Side-chain |
| N-bromoacetamide | 50 | 0 | 100 |
| N-bromomonochloroacetamide | 72 | 82 | 18 |
| N-bromodichloroacetamide | 64 | 64 | 36 |
| N-bromotrichloroacetamide | 58 | 17 | 83 |

From the above studies, it is evident that the chemical behavior of the chlorinated N-bromoactamides could not have been predicted on the basis of classical organic chemistry.

These compounds are useful and new brominating agents and may be utilized in various organic reactions as mild and specific oxidizing agents.

The invention in its broader aspects is not limited to the specific steps and compositions described but departures may be made therefrom within the scope of the accompanying claims without departing from the principles of the invention and without sacrificing its chief advantages.

We claim:
1. A process for producing compounds represented by the formula

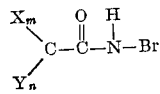

wherein X is a chlorine atom, Y is a hydrogen atom, the sum of $m+n$ is 3, $m$ is from 1 to 3 and $n$ is from 0 to 2 in which a chlorinated acetamide of the formula

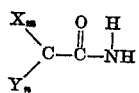

wherein X is a chlorine atom, Y is a hydrogen atom, the sum of $m+n$ is 3, $m$ is from 1 to 3 and $n$ is from 0 to 2, is reacted with bromine and a heavy metal oxide selected from the group consisting of silver oxide and mercuric oxide in solution in a perfluorinated aliphatic carboxylic acid.

2. A process as defined in claim 1 in which the perfluorinated acid is trifluoroacetic acid.

3. A process as defined in claim 1 in which the heavy metal oxide is silver oxide.

4. A process as defined in claim 1 in which the heavy metal oxide is silver oxide and the perfluorinated acid is trifluoroacetic acid.

5. A process as defined in claim 4 in which $m$ is 1 and $n$ is 2.

6. A process as defined in claim 4 in which $m$ is 2 and $n$ is 1.

7. A process as defined in claim 4 in which $m$ is 3 and $n$ is 0.

8. N-bromotrichloroacetamide.

References Cited in the file of this patent

Francesconi, "Gazz. Chim. Ital." vol. 33 (I) 1903, pp. 228–30.

Parks et al., "J. Am. Chem. Soc." vol. 74 (1952) pp. 2189–93.

Lacher et al., "J. Am. Chem. Soc." vol. 74 (1952) pp. 5578–80.